(12) United States Patent
Edelstein et al.

(10) Patent No.: US 10,129,277 B1
(45) Date of Patent: Nov. 13, 2018

(54) METHODS FOR DETECTING MALICIOUS NETWORK TRAFFIC AND DEVICES THEREOF

(71) Applicant: F5 Networks, Inc., Seattle, WA (US)

(72) Inventors: Sergei Edelstein, Herzliya (IL); Shlomo Yona, Kfar Yona (IL)

(73) Assignee: F5 Networks, Inc., Seattle, WA (US)

( * ) Notice: Subject to any disclaimer, the term of this patent is extended or adjusted under 35 U.S.C. 154(b) by 139 days.

(21) Appl. No.: 15/146,586

(22) Filed: May 4, 2016

Related U.S. Application Data

(60) Provisional application No. 62/157,119, filed on May 5, 2015.

(51) Int. Cl.
- *H04L 9/00* (2006.01)
- *G06F 21/00* (2013.01)
- *H04L 29/06* (2006.01)

(52) U.S. Cl.
CPC ...... *H04L 63/1425* (2013.01); *H04L 63/1441* (2013.01)

(58) Field of Classification Search
CPC ............. H04L 63/1425; H04L 63/1408; H04L 63/1441; H04L 63/20; H04L 63/1433; G06F 21/552; G06F 21/554
See application file for complete search history.

(56) References Cited

U.S. PATENT DOCUMENTS

| | | | |
|---|---|---|---|
| 6,314,408 B1 | 11/2001 | Salas et al. | |
| 7,228,412 B2 | 6/2007 | Freed | |
| 8,185,475 B2 | 5/2012 | Hug | |
| 9,077,709 B1 | 7/2015 | Dall | |
| 9,589,114 B2 | 5/2017 | Strom et al. | |
| 9,654,485 B1* | 5/2017 | Neumann | H04L 63/1416 |
| 2004/0103283 A1 | 5/2004 | Hornak | |
| 2007/0219917 A1 | 9/2007 | Liu et al. | |
| 2008/0059797 A1 | 3/2008 | Tokuno et al. | |
| 2008/0010207 A1 | 6/2008 | Yanagihara et al. | |
| 2008/0263215 A1 | 10/2008 | Schnellbaecher | |
| 2010/0017627 A1 | 6/2010 | Princen et al. | |

(Continued)

OTHER PUBLICATIONS

F5 Networks, Inc., "F5 TMOS Operation Guide", Manual, Mar. 5, 2015, pp. 1-297.

(Continued)

*Primary Examiner* — Alexander Lagor
(74) *Attorney, Agent, or Firm* — LeClairRyan PLLC

(57) ABSTRACT

A method, non-transitory computer readable medium, and anomaly detection apparatus that monitors network traffic exchanged with a plurality of client devices and a plurality of server devices to obtain client-side signal data for a plurality of client-side signals and server-side signal data for a plurality of server-side signals. A determination is made when a server health anomaly or a network traffic anomaly is a false positive based at least in part on a comparison of at least a portion of the client-side signal data or at least a portion of the server-side signal data to a historical scoreboard database comprising historical data regarding one or more historical network traffic or server health anomalies. A mitigation action is initiated when the determining indicates that one or more of the server health anomaly or network traffic anomaly is not a false positive.

18 Claims, 4 Drawing Sheets

(56) References Cited

U.S. PATENT DOCUMENTS

| | | |
|---|---|---|
| 2010/0325418 A1 | 12/2010 | Kanekar |
| 2011/0154026 A1 | 6/2011 | Edstrom |
| 2011/0264905 A1 | 10/2011 | Ovsiannikov |
| 2014/0095865 A1 | 4/2014 | Yerra |
| 2014/0298419 A1 | 10/2014 | Boubez |

OTHER PUBLICATIONS

F5 Networks, Inc., "BIG-IP® TMOSO® Implementations", Manual, Jan. 31, 2014, pp. 1-274, Version 11.5.

BIG-IP® Analytics: Implementations, version 11.3, Nov. 15, 2012, F5 Networks, Inc., pp. 1-40.

F5 Networks, "BIG-IP Local Traffic Manager: Concepts", version 11.4, pp. 1-178, retrieved from https://support.f5.com/kb/en-us/products/big-ip_ltm/manuals/product/ltm-concepts-11-4-0.html on Feb. 12, 2015.

F5 Networks, "BIG-IP Local Traffic Manager: Implementations", version 11.4, pp. 1-234, retrieved from https://support.f5.com/kb/en-us/products/big-ip_ltm/manuals/product/ltm-implementations-11-4-0.html on Feb. 12, 2015.

F5 Networks, "BIG-IP Local Traffic Manager: Monitors Reference", version 11.4, pp. 1-106, retrieved from https://support.f5.com/kb/en-us/products/big-ip_ltm/manuals/product/ltm-monitors-reference-11-4-0.html on Feb. 12, 2015.

F5 Networks, "Operations Guide 1.0 F5 Local Traffic Manager and Global Traffic Manager", pp. 1.144, retrieved from https://support.f5.com/kb/en-us/products/big-ip_ltm/manuals/product/f5-ltm-gtm-operations-guide-1-0.html on Feb. 12, 2015.

F5 Networks, "Release Note: BIG-IP LTM and TMOS", version 11.4.1, pp. 1-58, retrieved from https://support.f5.com/kb/en-us/products/big-ip_ltm/releasenotes/product/relnote-ltm-11-4-1.html on Feb. 12, 2015.

F5 Networks, Inc., "BIG-IP Application Security Manager Operations Guide", Manual, Feb. 5, 2016, pp. 1-181, F5 Networks, Inc.

F5 Networks, Inc., "BIG-IP ASM 11.5.0", Release Notes, Apr. 12, 2016, Version 11.5.0.

F5 Networks, Inc., "BIG-IP ASM", Release Notes, Jun. 13, 2016, pp. 1-18, version 11.6.1 F5 Networks, Inc.

F5 Networks, Inc., "BIG-IP® Analytics: Implementations", Manual, Jan. 31, 2014, pp. 1-50, Version 11.5.

F5 Networks, Inc., "BIG-IP® Analytics: Implementations", Manual, Aug. 25, 2014, pp. 1-62, v11.6, F5 Networks, Inc.

F5 Networks, Inc., "BIG-IP® Application Security Manager™: Getting Started", Manual, Aug. 25, 2014, pp. 1-78, version 11.6, F5 Networks, Inc.

F5 Networks, Inc., "BIG-IP® Application Security Manager™: Implementations", Manual, Aug. 25, 2014, pp. 1-420, version 11.6, F5 Networks, Inc.

F5 Networks, Inc., "BIG-IP® Application Security Manager™: Implementations", Manual, Jan. 31, 2014, pp. 1-396, Version 11.5.

F5 Networks, Inc., "BIG-IP® Application Security Manager™: Implementations", F5 Networks, Inc., Dec. 10, 2014, version 11.6, pp. 1-420.

F5 Networks, Inc., "BIG-IP® Local Traffic Management: Basics", Manual, Aug. 25, 2014, pp. 1-74, version 11.6, F5 Networks, Inc.

F5 Networks, Inc., "BIG-IP® Network Firewall: Policies and Implementations", Manual, Aug. 10, 2016, pp. 1-166, v11.6, F5 Networks, Inc.

F5 Networks, Inc., "BIG-IP® Systems: DoS Protection and Protocol Firewall Implementations", Manual, Aug. 25, 2014, pp. 1-108, v11.6, F5 Networks, Inc.

F5 Networks, Inc., "BIG-IP® TMOS®: Concepts", Manual, Nov. 11, 2014, pp. 1-148, Version 11.5.

F5 Networks, Inc., "BIG-IP® TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, Inc.

\* cited by examiner

METHODS FOR DETECTING MALICIOUS NETWORK TRAFFIC AND DEVICES THEREOF

This application claims the benefit of U.S. Provisional Patent Application Ser. No. 62/157,119, filed on May 5, 2015, which is hereby incorporated by reference in its entirety.

FIELD

This technology generally relates to computer network security and, more particular, to methods and devices for distinguishing malicious and false positive network traffic anomalies.

BACKGROUND

Storage networks generally include server devices that store data, such as web applications, web pages, or other content. Often, the server devices are protected from malicious attacks by traffic management computing devices, which often perform other functions including load balancing and application acceleration, for example. One such set of attacks are denial of service (DoS) or distributed denial of service (DDoS) attacks, although many other types of malicious attacks exist. The malicious attacks can be identified based on anomalous network traffic received by the traffic management computing devices, for example.

However, current methods of identifying malicious attacks are not robust, and false positives often occur resulting in the implementation of a mitigation technique on benign traffic. For example, current traffic management computing devices often mistake an increase in network traffic volume as an attack when the associated network traffic may not be malicious and the increased network traffic may be desirable. In another example, current traffic management computing devices often determine that a network traffic pattern is malicious even though the corresponding server devices are not experiencing a health problem and can service all of the current network traffic. Since the server devices are not experiencing any issues in this example, the identification of the network traffic pattern as malicious is likely a false positive. Current traffic management computing devices are ineffective at distinguishing network attacks from false positives.

SUMMARY

A method for detecting malicious network traffic includes monitoring, by an anomaly detection apparatus, network traffic exchanged with a plurality of client devices and a plurality of server devices to obtain client-side signal data for a plurality of client-side signals and server-side signal data for a plurality of server-side signals. A determination is made, by the anomaly detection apparatus, when a server health anomaly or a network traffic anomaly is a false positive based at least in part on a comparison of at least a portion of the client-side signal data or at least a portion of the server-side signal data to a historical scoreboard database comprising historical data regarding one or more historical network traffic or server health anomalies. A mitigation action is initiated, by the anomaly detection apparatus, when the determining indicates that one or more of the server health anomaly or network traffic anomaly is not a false positive.

An anomaly detection apparatus includes memory comprising programmed instructions stored in the memory and one or more processors configured to be capable of executing the programmed instructions stored in the memory to monitor network traffic exchanged with a plurality of client devices and a plurality of server devices to obtain client-side signal data for a plurality of client-side signals and server-side signal data for a plurality of server-side signals. A determination is made when a server health anomaly or a network traffic anomaly is a false positive based at least in part on a comparison of at least a portion of the client-side signal data or at least a portion of the server-side signal data to a historical scoreboard database comprising historical data regarding one or more historical network traffic or server health anomalies. A mitigation action is initiated when the determining indicates that one or more of the server health anomaly or network traffic anomaly is not a false positive.

A non-transitory computer readable medium having stored thereon instructions for detecting malicious network traffic includes executable code which when executed by one or more processors, causes the one or more processors to perform steps including monitoring network traffic exchanged with a plurality of client devices and a plurality of server devices to obtain client-side signal data for a plurality of client-side signals and server-side signal data for a plurality of server-side signals. A determination is made when a server health anomaly or a network traffic anomaly is a false positive based at least in part on a comparison of at least a portion of the client-side signal data or at least a portion of the server-side signal data to a historical scoreboard database comprising historical data regarding one or more historical network traffic or server health anomalies. A mitigation action is initiated when the determining indicates that one or more of the server health anomaly or network traffic anomaly is not a false positive.

This technology has a number of associated advantages including providing methods, non-transitory computer readable media, and network security apparatuses that improve network security by more accurately identifying network traffic requiring mitigation. This technology advantageously cross-references network traffic anomalies determined to be malicious with server health to more accurately determine whether the determination is a false positive. This technology facilitates consideration of network traffic and server health anomalies on a timeline, allowing frequent or periodic events to be ruled out or given less consideration under the assumption that anomalies that frequently or periodically occur are expected or benign events. As a result, this technology significantly reduces false positives and more accurately detects network attacks.

DETAILED DESCRIPTION

Figure 1:
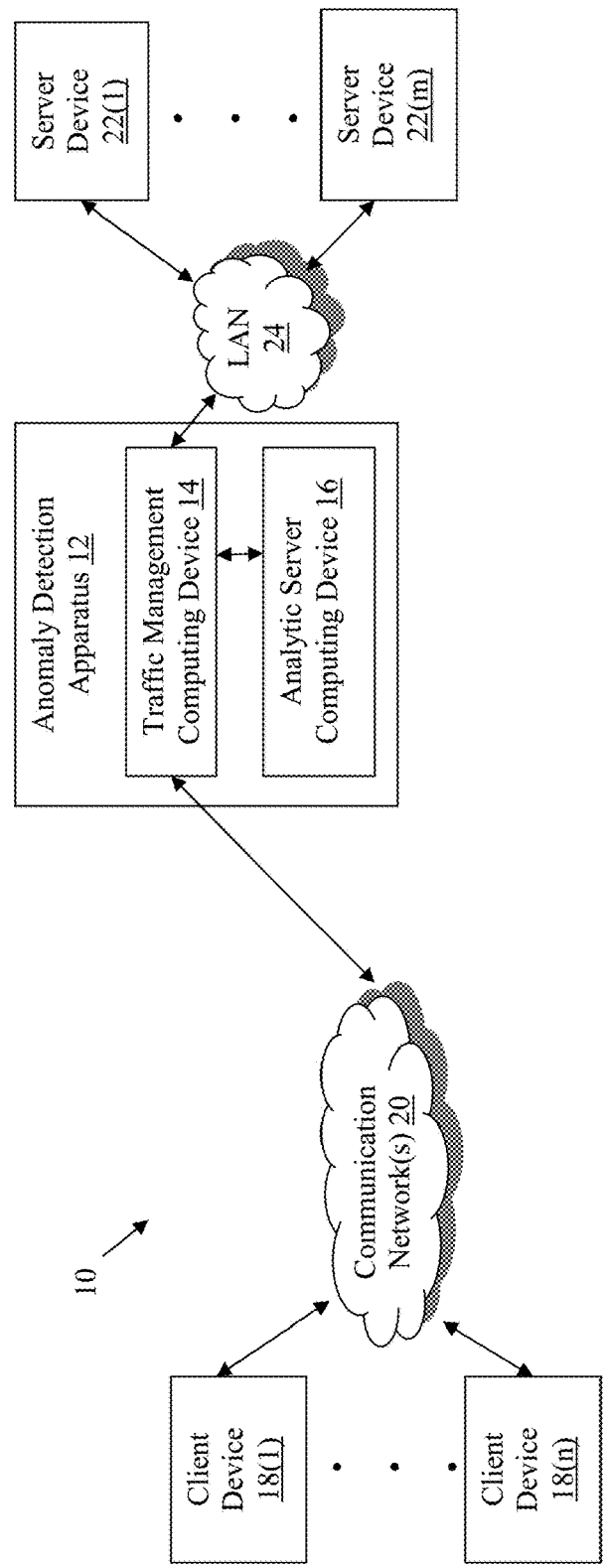
FIG. 1 is a block diagram of a network environment with an exemplary anomaly detection apparatus with a traffic management computing device and an analytic server computing device.

An exemplary network environment 10 including an exemplary anomaly detection apparatus 12 with a traffic management computing device 14 and an analytic server computing device 16 is illustrated in FIG. 1. In this example, the traffic management computing device 14 is coupled to client devices 18(1)-18(n) through communication network(s) 20, server devices 22(1)-22(m) through a local area network (LAN) 24, and the analytic server computing device 16 through a direct connection, although the traffic management computing device 12, client devices 18(1)-18(n), server devices 22(1)-22(m), and analytic server computing device 16 may be coupled together via other topologies. The network environment 10 may also include other network devices, such as one or more routers and/or switches, for example, which are well known in the art and thus will not be described herein. This technology provides a number of advantages including methods, non-transitory computer readable media, and anomaly detection apparatuses that more effectively identify malicious network traffic requiring mitigation by reducing false positives and correlating network traffic anomalies with server health indications and historical anomalous events.

Figure 2:
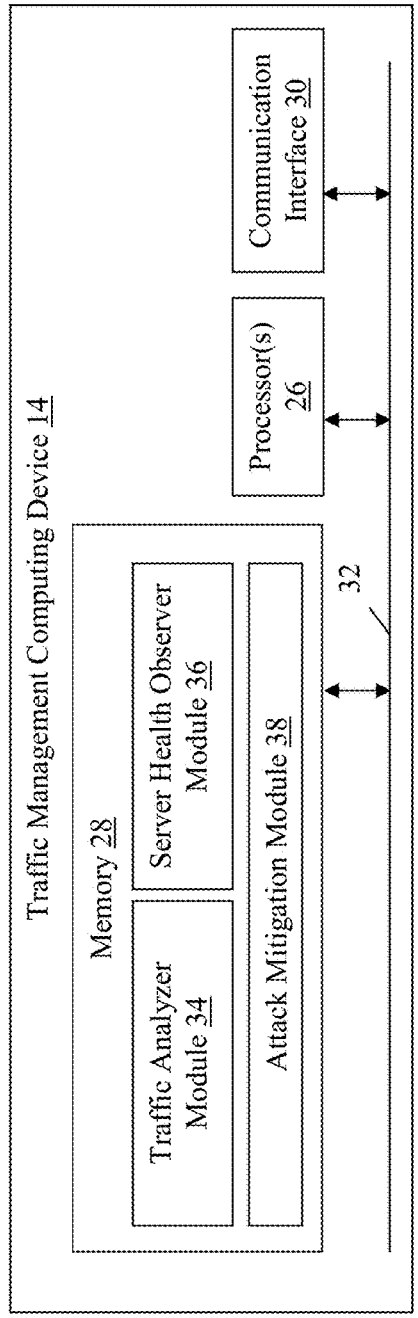
FIG. 2 is a block diagram of the exemplary traffic management computing device shown in FIG. 1.

Referring to FIGS. 1-2, the traffic management computing device 14 may perform any number of functions in addition to detecting malicious network traffic including accelerating and optimizing network traffic communicated between the server devices 22(1)-22(m) and client devices 18(1)-18(n) in order to improve the user experience. The traffic management computing device 14 can also perform other functions on the network traffic, such as load balancing the network traffic to the server devices 22(1)-22(m) and/or implementing firewalls or other security measures on behalf of web applications executing on the server devices, for example. The traffic management computing device 14 includes processor(s) 26, a memory 28, and a communication interface 30, which are coupled together by a bus 32 or other communication link, although the traffic management computing device 14 may include other types and numbers of elements in other configurations.

The processor(s) 26 of the traffic management computing device 14 may execute programmed instructions for any number of the functions identified above and/or described herein for detecting malicious network traffic and, optionally, managing network traffic and/or optimizing service of content requests, for example. The processor(s) 26 of the traffic management computing device 14 may include one or more central processing units and/or general purpose processors with one or more processing cores, for example, although other types of processor(s) can also be used.

The memory 28 of the traffic management computing device 14 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), flash, hard disk drives, solid state drives, or other computer readable medium which is read from and written to by a magnetic, optical, or other reading and writing system that is coupled to the processor(s) 26, can be used for the memory 28.

Figure 4:
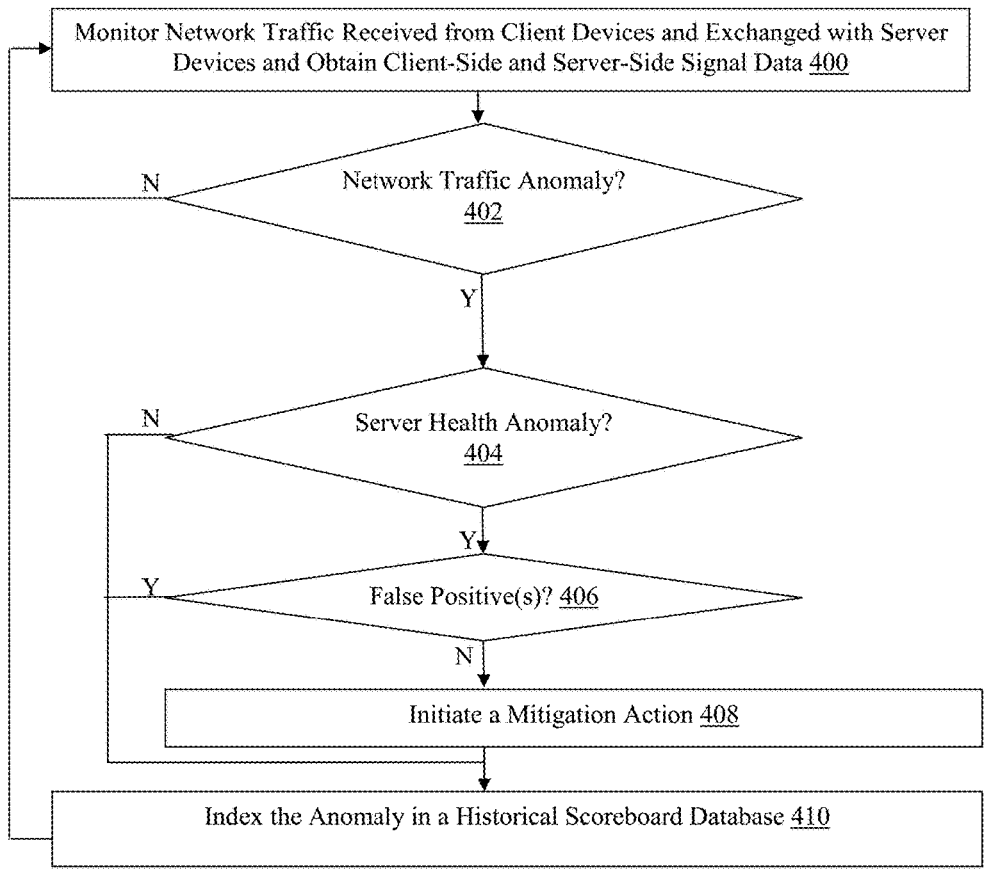
FIG. 4 is a flowchart of an exemplary method for detecting malicious network traffic.

Accordingly, the memory 28 of the traffic management computing device 14 can store one or more applications that can include computer executable instructions that, when executed by the traffic management computing device 14, cause the traffic management computing device 14 to perform actions, such as to transmit, receive, or otherwise process messages, for example, and to perform other actions described and illustrated below with reference to FIGS. 4-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the traffic management computing device 14 itself, may be located in virtual server(s) running in a cloud-based computing environment rather than being tied to one or more specific physical network computing devices. Also, the application(s) may be running in one or more virtual machines (VMs) executing on the traffic management computing device 14. Additionally, in one or more embodiments of this technology, virtual machine(s) running on the traffic management computing device 14 may be managed or supervised by a hypervisor.

In this particular example, the memory 28 further includes a traffic analyzer module 34, a server health observer module 36, and an attack mitigation module 38, although other modules can also be provided in other examples. The traffic analyzer module 34 obtains client-side signal data regarding observed client-side network traffic based on stored configurations and applies models to the signal data to determine whether an anomaly exists in the network traffic.

The server health observer module 36 is configured to monitor server-side signals to obtain server-side signal data and apply models in order to determine the health of the server devices 22(1)-22(m) or whether one or more of the server devices 22(1)-22(m) is experiencing an anomaly representative of a health issue. The attack mitigation module 38 executes mitigation actions when the traffic analyzer module 34 determines an anomaly exists in the network traffic requiring the initiation of a mitigation action, as described and illustrated in more detail later.

The communication interface 30 of the traffic management computing device 14 operatively couples and communicates between the traffic management computing device 14, client devices 18(1)-18(n), server devices 22(1)-22(m), and analytic server computing device 16, which are all coupled together by the LAN 24, communication network(s) 20 and direct connection(s), although other types and numbers of communication networks or systems with other types and numbers of connections and configurations to other devices and elements. By way of example only, the LAN and communication network(s) 20 can use TCP/IP over Ethernet and industry-standard protocols, including NFS, CIFS, SOAP, XML, LDAP, and SNMP, although other types and numbers of communication networks, can be used.

Figure 3:
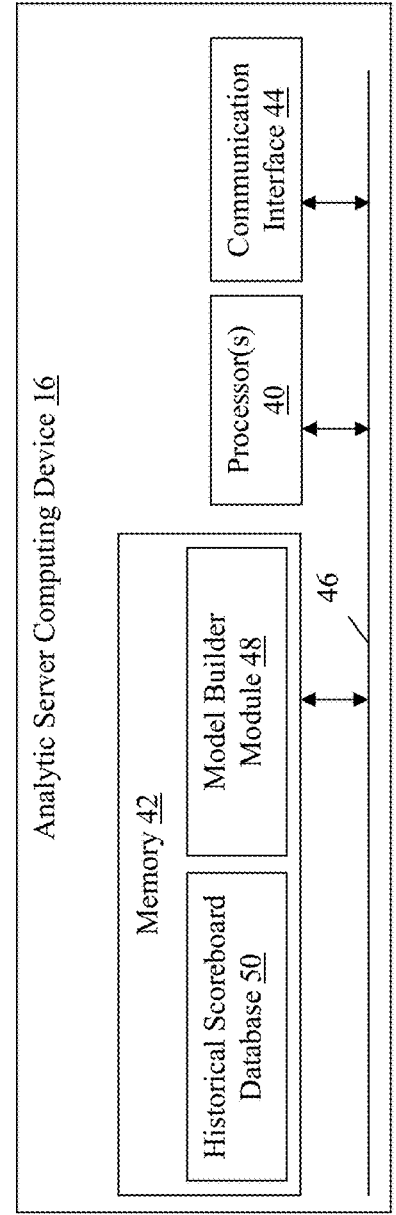
FIG. 3 is a block diagram of the exemplary analytic server computing device shown in FIG. 2.

Referring to FIGS. 1-3, the analytic server computing device 16 is configured to process signal data received from the traffic management computing device 14 and generate server health models that facilitate subsequent network traffic analysis by the traffic management computing device 14. While the analytic server computing device 16 is illustrated in this particular example as a separate device that allows significant processing related to model generation and machine learning to be performed separate from the traffic management computing device 14, in other examples, the functionality provided by the analytic server computing device 16 can be performed by analytic modules included in the memory 28 of the traffic management computing device 14, and other configurations can also be used.

In yet other examples, the analytic server computing device 16 can be located in a local network or outside of a local network and accessible via a cloud architecture, for example. In this particular example, the analytic server computing device 16 includes processor(s) 40, a memory 42, and a communication interface 44, which are coupled together by a bus 46 or other communication link, although the analytic server computing device 16 may include other types and numbers of elements in other configurations.

The processor(s) 40 of the analytic server computing device 16 may execute programmed instructions for any number of the functions identified above and/or described herein for generating server health models that facilitate the identification of anomalous network traffic by the traffic management computing device 14. The processor(s) 40 of the analytic server computing device 16 may include one or more central processing units and/or general purpose processors with one or more processing cores, for example.

The memory 42 of the analytic server computing device 16 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), flash memory, hard disk drives, solid state drives, or other computer readable medium which is read from and written to by a magnetic, optical, or other reading and writing system that is coupled to the processor(s) 40, can be used for the memory 42.

Accordingly, the memory 42 of the analytic server computing device 16 can store one or more applications that can include computer executable instructions that, when executed by the analytic server computing device 16, cause the analytic server computing device 16 to perform actions, such as to transmit, receive, or otherwise process messages, for example, and to perform other actions described and illustrated below with reference to FIGS. 4-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the analytic server computing device 20 itself, may be located in virtual server(s) running in a cloud-based computing environment rather than being tied to one or more specific physical network computing devices. Also, the application(s) may be running in one or more virtual machines (VMs) executing on the analytic server computing device 16. Additionally, in one or more embodiments of this technology, virtual machine(s) running on the analytic server computing device 16 may be managed or supervised by a hypervisor.

In this particular example, the memory 42 of the analytic server computing device 16 further includes a model builder module 48 and a historical scoreboard database 50. The model builder module 48 is configured to dynamically generate models that can be applied by the traffic management computing device 14 to identify anomalies in client-side and server-side signal data. The models can include thresholds for any number of client-side signals that together represent a traffic pattern and that, when one or more are exceeded, indicate that an anomaly exists in the observed client-side network traffic. Further, the models can facilitate the identification of anomalous server-side network traffic impacting the health of one or more of the server devices 22(1)-22(m). The models can include thresholds for any number of server-side signals and an estimated number of pending requests that, when one or more are exceeded, indicate that an anomaly exists, for example.

The historical scoreboard database 50 stores historical data regarding historical observed network traffic and server health anomalies. The data can include client-side signal data and server-side signal data, including at least the client-side signal data and server-side signal data that resulted in the determination of an anomaly. Additionally, the historical data can include a time of occurrence of each network traffic and server health anomaly and an indication of whether the network traffic or server health anomaly was treated as a false positive or as malicious, or was subsequently determined to be a false positive or to be malicious. Other information can also be included in the historical data stored by the historical scoreboard database 50. Accordingly, the historical scoreboard database 50 facilitates the determination of whether a network traffic or server health anomaly is a false positive, as described and illustrated in more detail later.

The communication interface 44 of the analytic server computing device 16 operatively couples and communicates with the traffic management computing device 14, which is coupled to the analytic server computing devices by a direct connection or LAN (not shown), although other types and numbers of communication networks or systems with other types and numbers of connections and configurations to other devices and elements can also be used.

Each of the server devices 22(1)-22(m) in this example includes one or more processors, a memory, and a communication interface, which are coupled together by a bus or other communication link, although other numbers and types of network devices could be used. The server devices 22(1)-22(m) in this example process requests received from the client devices 18(1)-18(n) via the communication network(s) 20 according to the HTTP-based application RFC protocol, for example. Various applications may be operating on the server devices 22(1)-22(m) and transmitting data (e.g., files or Web pages) to the client devices 18(1)-18(n) via the traffic management computing device 14 in response to requests from the client devices 18(1)-18(n). The server devices 22(1)-22(m) may be hardware or software or may represent a system with multiple servers in a pool, which may include internal or external networks.

Although the server devices 22(1)-22(m) are illustrated as single devices, one or more actions of each of the server devices 22(1)-22(m) may be distributed across one or more distinct network computing devices that together comprise one or more of the server devices 22(1)-22(m). Moreover, the server devices 22(1)-22(m) are not limited to a particular configuration. Thus, the server devices 22(1)-22(m) may contain a plurality of network computing devices that operate using a master/slave approach, whereby one of the network computing devices of the server devices 22(1)-22(m) operate to manage and/or otherwise coordinate operations of the other network computing devices. The server devices 22(1)-22(m) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 22(1)-22(m) can operate within the traffic management computing devices 14 itself, rather than as a standalone server device. In this example, the one or more of the server devices 22(1)-22(m) operate within the memory 28 of the traffic management computing devices 14.

The client devices 18(1)-18(n) in this example include any type of computing device that can generate, receive, and process network traffic, such as mobile computing devices, desktop computing devices, laptop computing devices, tablet computing devices, virtual machines (including cloud-based computers), or the like. Each of the client devices 18(1)-18(n) in this example includes a processor, a memory, and a communication interface, which are coupled together by a bus or other communication link, although other numbers and types of network devices could be used.

The client devices 18(1)-18(n) may run interface applications, such as standard web browsers or standalone client applications, that may provide an interface to make requests for, and receive content stored on, one or more of the server devices 22(1)-22(m) via the communication network(s) 20. The client devices 18(1)-18(n) may further include a display device, such as a display screen or touchscreen, and/or an input device, such as a keyboard for example.

Although the exemplary network environment with the traffic management computing device 14, client devices 18(1)-18(n), server devices 22(1)-22(m), analytic server computing device 16, LAN 24, and communication network(s) 20 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 10, such as the traffic management computing device 14, client devices 18(1)-18(n), server devices 22(1)-22(m), or analytic server computing device 16, for example, may be configured to operate as virtual instances on the same physical machine. In other words, one or more of the traffic management computing device 14, client devices 18(1)-18(n), server devices 22(1)-22(m), or analytic server computing device 16 may operate on the same physical device rather than as separate devices communicating through communication network(s). Additionally, there may be more or fewer traffic management computing device, client devices, server devices, or analytic server computing devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as non-transitory computer readable media having instructions stored thereon for one or more aspects of the present technology as described and illustrated by way of the examples herein, as described herein, which when executed by a processor, cause the processor to carry out the steps necessary to implement the methods of the examples, as described and illustrated herein.

Exemplary methods for detecting anomalous network traffic will now be described with reference to FIGS. 1-5. Referring more specifically to FIG. 4, a method for detecting malicious network traffic with the anomaly detection apparatus 12 is illustrated. In step 400 in this example, the anomaly detection apparatus 12 monitors network traffic received from the client devices 18(1)-18(n) and exchanged with the server devices 22(1)-22(m) to obtain client-side signal data for a plurality of client-side signals and server-side signal data for a plurality of server-side signals in accordance with stored configuration(s).

The monitoring of the network traffic received from the client devices 18(1)-18(n) can be performed by the traffic analyzer module 34 stored in the memory 28 of the traffic management computing device 14 and the monitoring of the network traffic exchanged with the server devices 22(1)-22(m) can be performed by the server health observer module 36 of the traffic management computing device 14, for example. Additionally, in one example, the traffic management computing device 14 obtains the client-side and server-side signal data periodically (e.g., every second) over a specified period of time, and combines the signal data into a snapshot which is sent to the model builder module 48 of the analytic server computing device 16.

In this particular example, the client-side signals can relate to any characteristics of received network traffic (e.g., HTTP requests for content stored by the server devices). Accordingly, the client-side signal data can include a number and type of HTTP methods (e.g., GET and POST), a web browser type or user agent value, a device type (e.g., bots, desktop, or mobile), a number or value of HTTP headers, the existence of HTTP headers, or an HTTP request content type, for example, although any other type and/or number of client-side signals relating to observed network traffic originating with the client devices 18(1)-18(n) can also be used. The server-side signal data can include transactions per second, requests per second, request jitter, response jitter, drops per second, pending transactions per second, bytes in per second, bytes out per second, upload time, download time, idle time, inter-packet time, latency, or response codes, for example, although any other type and/or number of server-side signals related to observed network traffic originating with the server devices 22(1)-22(m) can also be used.

In step 402 in this example, the anomaly detection apparatus 12 determines whether there is a network traffic anomaly. One exemplary method for determining whether there is a network traffic anomaly is based on an application of a network traffic model to the client-side signal data, as described and illustrated in U.S. Provisional Patent Application Ser. No. 62/156,968, filed May 5, 2015 and entitled "Methods for Establishing Anomaly Detection Configurations and Identifying Anomalous Network Traffic and Devices Thereof," which is incorporated by reference herein in its entirety, although other methods of determining whether there is a network traffic anomaly can also be used in other examples.

If the anomaly detection apparatus 12 determines that there is not currently a network traffic anomaly, then the No branch is taken back to the first step and the anomaly detection apparatus 12 continues to monitor network traffic. However, if the anomaly detection apparatus 12 detects a network traffic anomaly, then the Yes branch is taken to step 404.

In step 404, the anomaly detection apparatus 12 cross-references the network traffic anomaly with server health in order to provide further information regarding whether the detected network traffic anomaly is malicious. One exemplary method for determining a score reflecting the health of the server devices 22(1)-22(m), and whether there is a server health anomaly, is based on an application of a server health model to the server-side signal data, as described and illustrated in U.S. Provisional Patent Application Ser. No. 62/156,973, filed May 5, 2015 and entitled "Methods for Analyzing Server Health and Devices Thereof," which is incorporated by reference herein in its entirety, although other methods of determining whether there is a server health anomaly can also be used in other examples.

Since network traffic anomalies generally result in server health issues, referencing a server health score for each of the server devices 22(1)-22(m) provides an indication of whether one or more of the server devices 22(1)-22(m) are experiencing health issues as a result of the detected network traffic anomaly. If the server devices 22(1)-22(m) are not experiencing health issues, then they may not require defending by a mitigation action at the current time. Accordingly, if the anomaly detection apparatus 12 determines in step 404 that there is a server health anomaly, then the Yes branch is taken to step 406.

In step 406, the anomaly detection apparatus 12 determines whether there is a false positive based at least in part on a comparison of the signal data corresponding to the detected network traffic and/or sever health anomaly and historical signal data associated with one or more other anomalies indicated in the historical scoreboard database 50. The historical scoreboard database 50 can be used to filter anomalies perceived as an attack but determined, based on stored historical anomaly data including historical traffic patterns, to be periodic or recurring events that are benign.

More specifically, in order to determine whether an observed anomaly is a false positive in one example, the anomaly detection apparatus 12 can determine whether a traffic pattern of one or more other corresponding network traffic anomalies is indicated in the historical scoreboard database 50 as preceding one or more server health anomalies. The historical scoreboard database 50 in this example stores data regarding historical observed network traffic anomalies including a time of occurrence and a traffic pattern including client-side signal data.

Accordingly, the anomaly detection apparatus 12 can compare the client-side signal data used to determine existence of a current network traffic anomaly to the traffic pattern associated with one or more historical network traffic anomalies to determine whether server health anomalies historically resulted from matching ones of the network traffic anomalies. If server health anomalies did not result from a significant or threshold number of corresponding historical network traffic anomalies, then the network traffic anomaly is likely a false positive.

Figure 5:
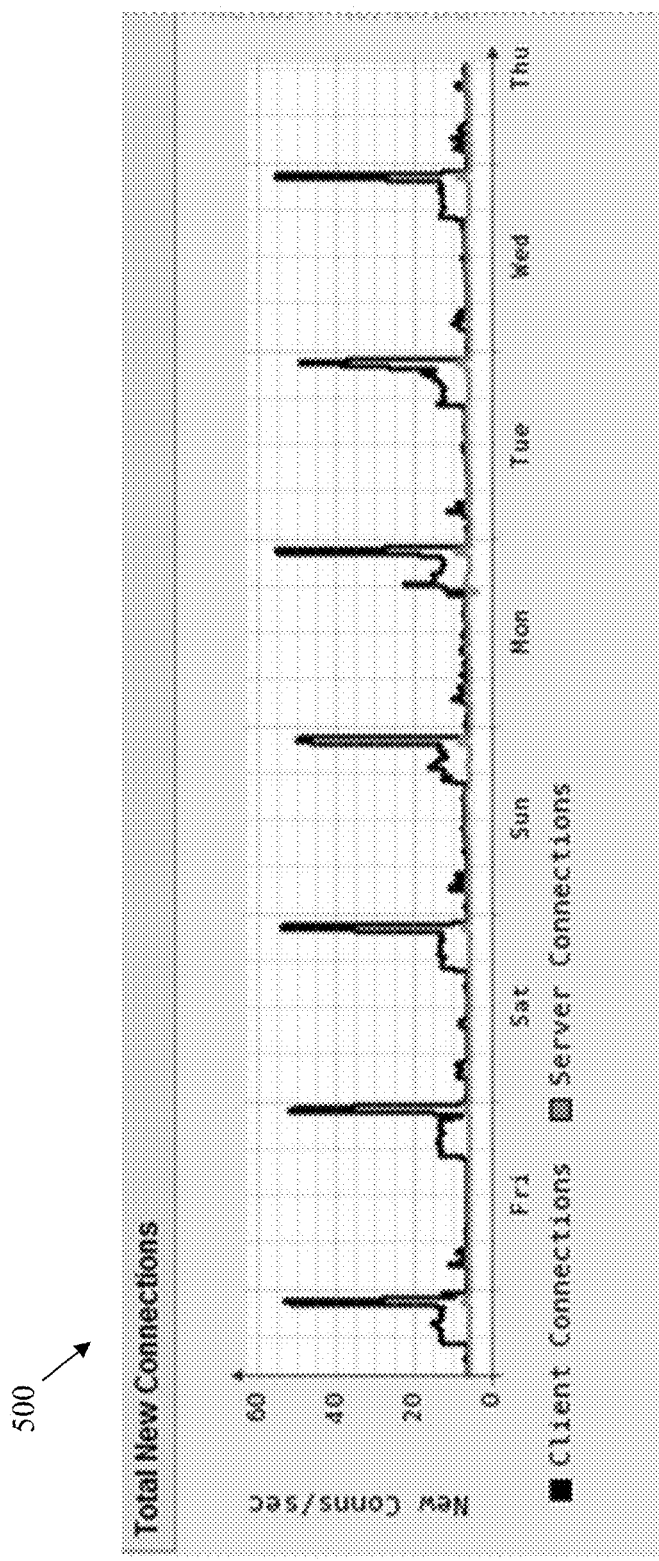
FIG. 5 is a graph of a historical number of new connections.

Referring more specifically to FIG. 5, an exemplary historical graph 500 of a number of new connections is illustrated. In this example, the anomaly detection apparatus determined that a network traffic anomaly existed at the time of each of the spikes in the number of client connections illustrated in the graph 500.

Accordingly, if a network traffic anomaly is detected in a current iteration based on the number of new client connections, the anomaly detection apparatus 12 can look back in the historical anomaly data in the historical scoreboard database 50 to determine that a number of network traffic anomalies having a matching traffic pattern (e.g., number of new client connections) were detected toward the end of each day over a seven day period. Therefore, the currently-detected network traffic anomaly is likely a false positive.

Accordingly, the historical scoreboard database 50 can be used to determine whether a currently-observed network traffic or server health anomaly is a false positive based on periodicity or seasonality of matching historical anomalies. While in this example the client-side signal data corresponding to the number of new connections is used to determine periodicity of network traffic anomalies, server-side signal data can also be used to determine the periodicity of a server health anomaly in a corresponding manner.

In yet another example, a learning process based on seasonality or periodicity can be performed by the analytic server computing device 16 while generating the network traffic or server health models used to determine the existence of a current anomaly. Accordingly, in the example illustrated in FIG. 5, the network traffic model can be updated to indicate that a spike in the number of new client connections occurring within the last hour of each day is not an anomalous network traffic pattern, for example, so that a network traffic anomaly will not be detected in a subsequent iteration of step 402 of FIG. 4 based on such obtained client-side signal data.

Additionally, other methods of using the historical scoreboard database 50 to determine whether an anomaly (e.g., network traffic, server health, or attack determination or any combination) is a false positive, or to update network traffic or server health models, can also be used in other examples. Referring back to FIG. 4, if the anomaly detection apparatus 12 determines in step 406 that the network traffic anomaly or the server health anomaly is not a false positive, then the No branch is taken to step 408. Accordingly, in this example, the anomaly detection apparatus 12 requires that a network traffic anomaly be detected, a server health issue has resulted, and that there are no false positives before proceeding to step 408.

In step 408, the anomaly detection apparatus 12 initiates a mitigation action. The mitigation action can be initiated by the attack mitigation module 38 in the memory 38 of the traffic management computing device 14. For example, the mitigation action can include blocking network traffic having certain characteristics, intentionally dropping packets from certain of the client devices, presenting certain of the client devices 18(1)-18(n) with challenges before proceeding to accept network traffic in order to confirm whether the client devices 18(1)-18(n) are malicious bots, redirecting network traffic to one or more relatively healthy of the server devices 22(1)-22(m), or any other type of mitigation action intended to defend one or more of the server devices 22(1)-22(m).

Subsequent to initiating the mitigation action in step 408, or if the anomaly detection apparatus 12 determines that there is no sever health issue in step 402 and the No branch is taken, or that there is a false positive and the Yes branch is taken from step 406, the anomaly detection apparatus 12 proceeds to step 410. In step 410, anomaly detection apparatus 12 indexes the network traffic and/or server health anomaly in the historical scoreboard database 50.

In this particular example, in order to index the network traffic and/or server health anomaly, the anomaly detection apparatus 12 optionally marks the network traffic anomaly or the server health anomaly as a false positive or malicious in the historical scoreboard database 50 according to the determination in step 406. Additionally, the anomaly detection apparatus 12 stores at least the client-side signal data and a time of occurrence corresponding to the network traffic anomaly and/or the server-side signal data and another time of occurrence corresponding to the server health anomaly in the historical scoreboard database 50. By indexing the detected one or more anomalies, the anomaly detection apparatus facilitates determining whether subsequently-detected anomalies are false positives.

More specifically, the historical scoreboard database 50 allows the anomaly detection apparatus to compare client-side and server-side signal data associated with currently-identified anomalies to historical data, including client-side and server-side signal data and a time of occurrence associated with previously-identified anomalies, to determine whether the currently-identified anomalies are false positives. Additionally, feedback received following the previously-identified anomalies can advantageously inform current decision-making by the anomaly detection apparatus 12 regarding whether a detected anomaly is a false positive or whether a mitigation action should be initiated.

For example, if the previously-identified anomalies were initially determined to be malicious, but later, as a result of a learning process, determined to be false positives, the marking of the previously-identified anomalies in the historical scoreboard database 50 can be updated accordingly. Therefore, subsequent detected anomalies can take advantage of post hoc information obtained for previously-identified anomalies indexed in the historical scoreboard database 50.

Accordingly, this technology more accurately identifies malicious network traffic requiring mitigation by cross-referencing with server health when network traffic anomalies are detected and considering periodicity or frequency of historical anomalies. Further, feedback received subsequent to detecting the existence of an anomaly can be used in a learning process to facilitate more effective subsequent analysis of detected anomalies.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for detecting malicious network traffic implemented by a network traffic management system comprising one or more anomaly detection apparatuses, server devices, or client devices, the method comprising:
monitoring network traffic exchanged with a plurality of clients and a plurality of servers to obtain client-side signal data and determining when a current network traffic anomaly has occurred based on the monitoring;
comparing at least a portion of the client-side signal data to a historical scoreboard database to identify one or more of a plurality of historical network traffic anomalies that correspond to the current network traffic anomaly, when the determining indicates that the current network traffic anomaly has occurred;
analyzing the historical scoreboard database to determine when the current network traffic anomaly is a false positive based at least in part on whether one or more of the plurality of historical network traffic anomalies precede one of a plurality of server health anomalies identified in the historical scoreboard database; and
initiating a mitigation action when the determining indicates that the network traffic anomaly is not a false positive.

2. The method of claim 1, further comprising determining when there is one of the sever health anomalies for one or more of the servers based on an application of a server health model to server-side signal data obtained based on the monitoring of the network traffic and when the current network traffic anomaly has occurred based on an application of a network traffic model to the client-side signal data.

3. The method of claim 1, further comprising determining when the current network traffic anomaly is a false positive based on whether a time of occurrence of the current network traffic anomaly corresponds to a pattern of the one or more of the plurality of historical network traffic anomalies in the historical scoreboard database.

4. The method of claim 1, further comprising storing at least the client-side signal data and a time of occurrence corresponding to the current network traffic anomaly in the historical scoreboard database.

5. The method of claim 4, further comprising marking the current network traffic anomaly as a false positive in the historical scoreboard database when the determining indicates that the current network traffic anomaly is a false positive.

6. A non-transitory computer readable medium having stored thereon instructions for detecting malicious network traffic comprising executable code which when executed by one or more processors, causes the one or more processors to:
monitor network traffic exchanged with a plurality of clients and a plurality of servers to obtain client-side signal data and determine when a current network traffic anomaly has occurred based on the monitoring;
compare at least a portion of the client-side signal data to a historical scoreboard database to identify one or more of a plurality of historical network traffic anomalies that correspond to the current network traffic anomaly, when the determining indicates that the current network traffic anomaly has occurred;
analyze the historical scoreboard database to determine when the current network traffic anomaly is a false positive based at least in part on whether one or more of the plurality of historical network traffic anomalies precede one of a plurality of server health anomalies identified in the historical scoreboard database; and
initiate a mitigation action when the determining indicates that the network traffic anomaly is not a false positive.

7. The non-transitory computer readable medium of claim 6, wherein the executable code when executed by the one or more processors further causes the one or more processors to determine when there is one of the sever health anomalies for one or more of the servers based on an application of a server health model to server-side signal data obtained based on the monitoring of the network traffic and when the current network traffic anomaly has occurred based on an application of a network traffic model to the client-side signal data.

8. The non-transitory computer readable medium of claim 6, wherein the executable code when executed by the one or more processors further causes the one or more processors to determine when the current network traffic anomaly is a false positive based on whether a time of occurrence of the current network traffic anomaly corresponds to a pattern of the one or more of the plurality of historical network traffic anomalies in the historical scoreboard database.

9. The non-transitory computer readable medium of claim 6, wherein the executable code when executed by the one or more processors further causes the one or more processors to store at least the client-side signal data and a time of occurrence corresponding to the current network traffic anomaly in the historical scoreboard database.

10. The non-transitory computer readable medium of claim 9, wherein the executable code when executed by the one or more processors further causes the one or more processors to mark the current network traffic anomaly as a false positive in the historical scoreboard database when the determining indicates that the current network traffic anomaly is a false positive.

11. An anomaly detection apparatus, comprising memory comprising programmed instructions stored thereon and one or more processors configured to be capable of executing the stored programmed instructions to:
  monitor network traffic exchanged with a plurality of clients and a plurality of servers to obtain client-side signal data and determine when a current network traffic anomaly has occurred based on the monitoring;
  compare at least a portion of the client-side signal data to a historical scoreboard database to identify one or more of a plurality of historical network traffic anomalies that correspond to the current network traffic anomaly, when the determining indicates that the current network traffic anomaly has occurred;
  analyze the historical scoreboard database to determine when the current network traffic anomaly is a false positive based at least in part on whether one or more of the plurality of historical network traffic anomalies precede one of a plurality of server health anomalies identified in the historical scoreboard database; and
  initiate a mitigation action when the determining indicates that the network traffic anomaly is not a false positive.

12. The anomaly detection apparatus of claim 11, wherein the one or more processors are further configured to be capable of executing the stored programmed instructions to determine when there is one of the sever health anomalies for one or more of the servers based on an application of a server health model to server-side signal data obtained based on the monitoring of the network traffic and when the current network traffic anomaly has occurred based on an application of a network traffic model to the client-side signal data.

13. The anomaly detection apparatus of claim 11, wherein the one or more processors are further configured to be capable of executing the stored programmed instructions to determine when the current network traffic anomaly is a false positive based on whether a time of occurrence of the current network traffic anomaly corresponds to a pattern of the one or more of the plurality of historical network traffic anomalies in the historical scoreboard database.

14. The anomaly detection apparatus of claim 11, wherein the one or more processors are further configured to be capable of executing the stored programmed instructions to store at least the client-side signal data and a time of occurrence corresponding to the current network traffic anomaly in the historical scoreboard database.

15. The anomaly detection apparatus of claim 14, wherein the one or more processors are further configured to be capable of executing the stored programmed instructions to mark the current network traffic anomaly as a false positive in the historical scoreboard database when the determining indicates that the current network traffic anomaly is a false positive.

16. A network traffic management system comprising one or more anomaly detection apparatuses, server devices, or client devices, the network traffic management system comprising memory comprising programmed instructions stored thereon and one or more processors configured to execute the stored programmed instructions to:
  monitor network traffic exchanged with a plurality of clients and a plurality of servers to obtain client-side signal data and determine when a current network traffic anomaly has occurred based on the monitoring;
  compare at least a portion of the client-side signal data to a historical scoreboard database to identify one or more of a plurality of historical network traffic anomalies that correspond to the current network traffic anomaly, when the determining indicates that the current network traffic anomaly has occurred;
  analyze the historical scoreboard database to determine when the current network traffic anomaly is a false positive based at least in part on whether one or more of the plurality of historical network traffic anomalies precede one of a plurality of server health anomalies identified in the historical scoreboard database; and
  initiate a mitigation action when the determining indicates that the network traffic anomaly is not a false positive.

17. The network traffic management system of claim 16, wherein the one or more processors are further configured to execute the stored programmed instructions to determine when there is one of the sever health anomalies for one or more of the servers based on an application of a server health model to server-side signal data obtained based on the monitoring of the network traffic and when the current network traffic anomaly has occurred based on an application of a network traffic model to the client-side signal data.

18. The network traffic management system of claim 16, wherein the one or more processors are further configured to execute the stored programmed instructions to determine when the current network traffic anomaly is a false positive based on whether a time of occurrence of the current network traffic anomaly corresponds to a pattern of the one or more of the plurality of historical network traffic anomalies in the historical scoreboard database.

* * * * *